US005926948A

United States Patent [19]

Pong

[11] Patent Number: 5,926,948

[45] Date of Patent: Jul. 27, 1999

[54] D-TYPE CONNECTOR UNPLUGGING TOOL

[75] Inventor: Sing-Song Pong, Hsinchu, Taiwan

[73] Assignee: Chung-Shan Institute of Science & Technology, Taiwan

[21] Appl. No.: 08/927,272

[22] Filed: Sep. 11, 1997

[30] Foreign Application Priority Data

Aug. 7, 1997 [TW] Taiwan ................................ 86213354

[51] Int. Cl.[6] ...................................................... B23P 19/00

[52] U.S. Cl. ................................ 29/764; 29/758; 29/762

[58] Field of Search ............................. 29/741, 729, 747, 29/748, 758, 762, 764

[56] References Cited

U.S. PATENT DOCUMENTS

| | | | |
|---|---|---|---|
| 3,117,370 | 1/1964 | Kauppi et al. . | |
| 3,317,989 | 5/1967 | Cull . | |
| 4,424,625 | 1/1984 | Callahan | 29/764 |
| 4,984,355 | 1/1991 | Lubrano et al. | 29/741 |
| 5,440,803 | 8/1995 | Selgas, Jr. et al. | 29/764 |
| 5,566,445 | 10/1996 | Piao | 29/741 |
| 5,613,870 | 3/1997 | Traver, Jr. | 439/352 |

*Primary Examiner*—Peter Vo
*Assistant Examiner*—Kevin G. Vereene
*Attorney, Agent, or Firm*—Finnegan, Henderson, Farabow, Garrett & Dunner, L.L.P.

[57] ABSTRACT

A D-type connector unplugging tool comprising two metal arms, a plurality of positioning grooves, a handle, two U-shaped end sections and a push-pin assembly. The metal arms have a front end and a back end. The metal arms are coupled together at a back end and formed a clamp opening at a front end. The positioning grooves are located at corresponding positions on the metal arms between the front end and the back end. The handle is fixed onto the back end of the metal arms. The two U-shaped end sections are extensions secured to the front end of the two metal arms and each having a notch at its tip. The push-pin assembly further includes a main body having two ends locally fastened to the metal arms such that the whole push-pin assembly can slide along the two metal arms between the front end and the back end; also, there is a circular tube fixed to the main body and inside the tube there is a spring having two steel balls placed at each end. As the push-pin assembly slide along the metal arms, the compressed spring pushes the steel balls against the arms till lodging into one pair of positioning grooves, thereby freezing the clamp opening. Therefore, by sliding the push-pin assembly to a proper position along the metal arms, the appropriate clamp opening can be obtained.

5 Claims, 5 Drawing Sheets

D-TYPE CONNECTOR UNPLUGGING TOOL

BACKGROUND OF THE INVENTION

1. Field of Invention

The present invention relates to a D-type connector unplugging tool. More particularly, the present invention relates to a D-type connector unplugging tool which is useful for unplugging male/female connectors of various D-type connector sizes without causing any damage to the D-type connectors.

2. Description of Related Art

D-type connector is a widely used electrical component for connecting electronic equipment, such as in weaponry system, testing equipment, and office machines. For example, the D-type connector has been used to connect the serial I/O port (RS-232) of a main computer terminal to a computer peripheral device (a printer), and in the military industry, the connector serves to connect and transmit vital electronic information between electrical circuits in a piloting device. D-type connectors can be divided according to its pincount into 9-pin, 15-pin, 25-pin, 37-pin and 50-pin connector, respectively. The biggest D-type connector is the 50-pin one having an overall length of about 6.5 cm, while the smallest 9-pin has an overall length of just 3 cm.

FIG. 1 is a sketch of a conventional D-type connector. As shown in FIG. 1, a conventional D-type connector comprises of a male plug 10 and a female socket 12. The male plug 10 and the female socket 12 each has a metal housing 14 and 16, respectively. Because the connective parts 18 and 20 of the respective metal housing 14 and 16 has a D-shaped external appearance, therefore the connector is dubbed a D-type connector. For the male plug 10, there are a plurality of pins 22 inside the connective part 18 of the metal housing 14, and those pins are fixed in position by a surrounding plastic piece (not shown in the Figure). For the corresponding female socket 12, there are the same number of pin holes 24 inside the connective part 20 of the metal housing 16, and the pin holes 24 are also fixed in position by another surrounding plastic piece 26. In addition, both the pins 22 of the male plug 10 and the pin holes 24 of the female socket 12 are arranged systematically in alternating rows that corresponds in position with each other. The connective part 18 of the male plug 10 is made slightly larger than the connective part 20 of the female socket 12 so that they form a tight fit. At the backside of the connective parts 18 and 20 of the male/female connecting heads 10 and 12, there are wiring outlets where each pin or pin hole can be connected to a wire or directly soldered onto a circuit board (not shown in the Figure). Corresponding to the metal housings 14 and 16 of the male plug 10 and female socket 12, there are plate extensions 30 and 32, respectively. The plate extension 32 has a pair of screws 34 one on each side, and the plate extension 30 has a pair of internally threaded holes 36 matching in position with a pair of screws 34. The screws 34 and holes 36 serve to fasten the male plug 10 and female socket 12 in position when they are plugged together. Additionally, there are a pair of padding plates 38 one on each side attached to the plate extension 32 and positioned by the screws 34.

For D-type connector used in computers, the part between the connector head and the wire connecting section is normally enclosed in a plastic housing to protect the pins and wires against any accidental wire breakages or pin pull-outs in the process of unplugging the connector. However, for special purpose D-type connectors, for example, used by the military and avionic equipment in particular, in which flexibility in manufacturing, light-weightedness, and ease of maintenance must be considered, there will be no plastic housing. Conventionally, there is no specific tools or methods to help separate the male plug from the female socket. When the number of pins in the connector is large, a greater amount of force is needed to pull the connector apart. One method is to use a pry to force open the metal housings a little and then rocking alternately to loosen the connector. Sometimes, this method is unusable simply because there is too little space to maneuver. This is especially serious for connectors installed in a densely packed and tightly spaced environment such as inside the narrow airplane compartments. Therefore, unconventional method such as holding the connecting wires to pull out the connecting heads is sometimes used. However, such unconventional method may cause the breaking of wires, the out-pulling of pins or some damage to the connector.

In light of the foregoing, there is a need in the art in providing a tool for unplugging the D-type connector.

SUMMARY OF THE INVENTION

Accordingly, the present invention is to provide a D-type connector unplugging tool that helps to unplug D-type connectors with ease even in confined space. Moreover, the tool will not damage neither the connector nor the connecting wires during the unplugging process.

To achieve these and other advantages and in accordance with the purpose of the invention, as embodied and broadly described herein, the invention includes a D-type connector unplugging tool comprising a clamping structure, a positioning device, a handle and two hooked sections. The clamping structure has a front end and a back end. A clamp opening is formed at the front end, while the handle is fixed onto the back end. The positioning device is mounted onto the clamping structure and can slide along the clamping structure between the front end and the back end. The positioning device is used for varying the extent of the clamp opening and then freezing the clamp opening once a desired opening for grasping the D-type connector is attained. Also, two hooked sections are installed at the front end of the clamping structure.

In another aspect, the clamping structure comprises of two metal arms having their back end coupled together and a bend somewhere along the metal arms to maintain a section near the front end of the metal arms roughly parallel to each other. The positioning device comprises of a plurality of positioning grooves located between the front end and the back end that match the operation of a push-pin assembly. The pushpin assembly includes a main body, a circular tube, a compression spring and two steel balls. The main body has two ends that are locally fastened to the metallic arms such that the main body is capable of sliding along the two metallic arms between the front end and the back end. The circular tube is fixed to the main body; and the spring having one steel ball at each end is housed inside the circular tube such that as the pushpin assembly slides along the arms, the compression spring pushes the steel balls against the arms till the balls lodge into one pair of positioning grooves in the arms, thereby locking the push-pin assembly in position. The hooked sections are U-shaped extensions each having a notch at its tip and secured to the metallic arm at the other.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
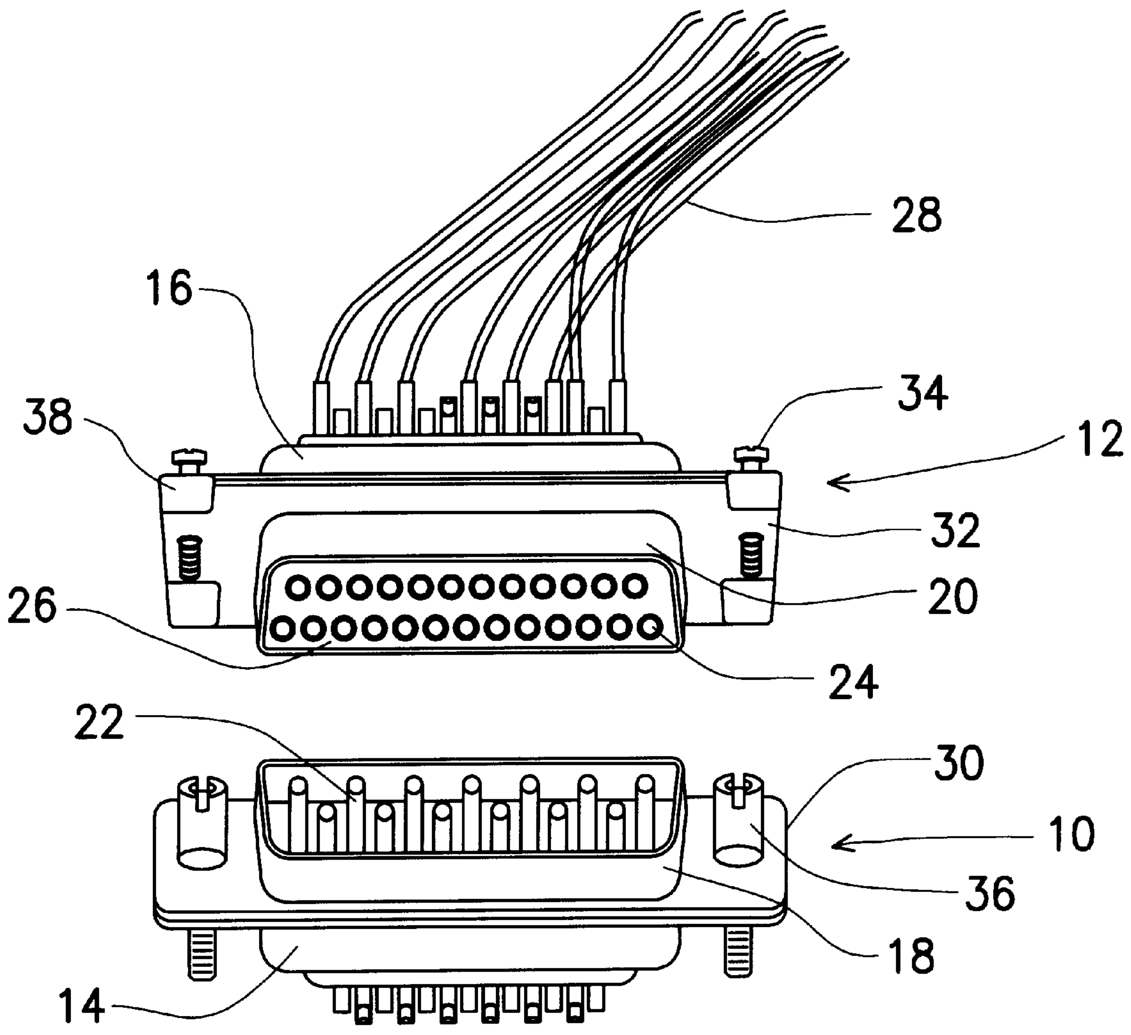
FIG. 1 (PRIOR ART)
FIG. 1 is a sketch of a conventional D-type connector.

Reference will now be made in detail to the present preferred embodiments of the invention, examples of which are illustrated in the accompanying drawings. Wherever possible, the same reference numbers are used in the drawings and the description to refer to the same or like parts.

Figure 2:
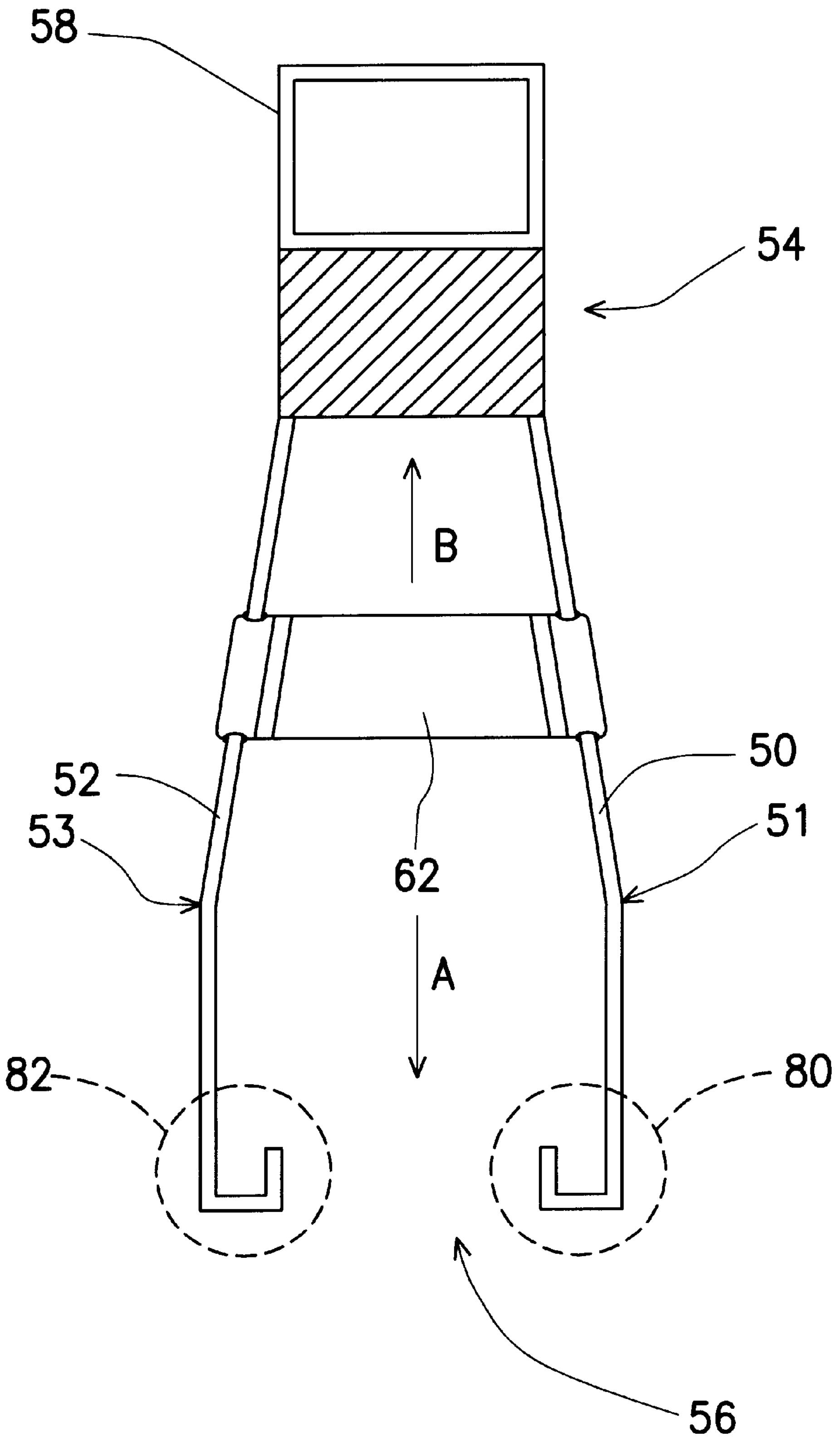
FIG. 2 is a sketch of a D-type connector unplugging tool according to one preferred embodiment of this invention.

FIG. 2 is a sketch of a D-type connector unplugging tool according to one preferred embodiment of this invention. The D-type connector unplugging tool of this invention comprises:

(1) two metal arms 50 and 52, constituting the main structure for clamping the connector, which are coupled together at the back end 54 and forming a clamp opening for clamping part of the D-type connector at the front end 56;

(2) a handle 58, fixed to the back end 54 of the metal arms 50 and 52 such that when the D-type connector is tightly clamped by the metal arms 50 and 52, the handle 58 enables the user to apply force more conveniently during unplugging;

(3) hooked sections 80 and 82, to ensure a tight grip of the D-type connector by the metal arms 50 and 52; and (4) a positioning device 62, for varying the extent of the clamp opening and then freezing the clamp opening once a desired opening width is reached.

Figure 3:
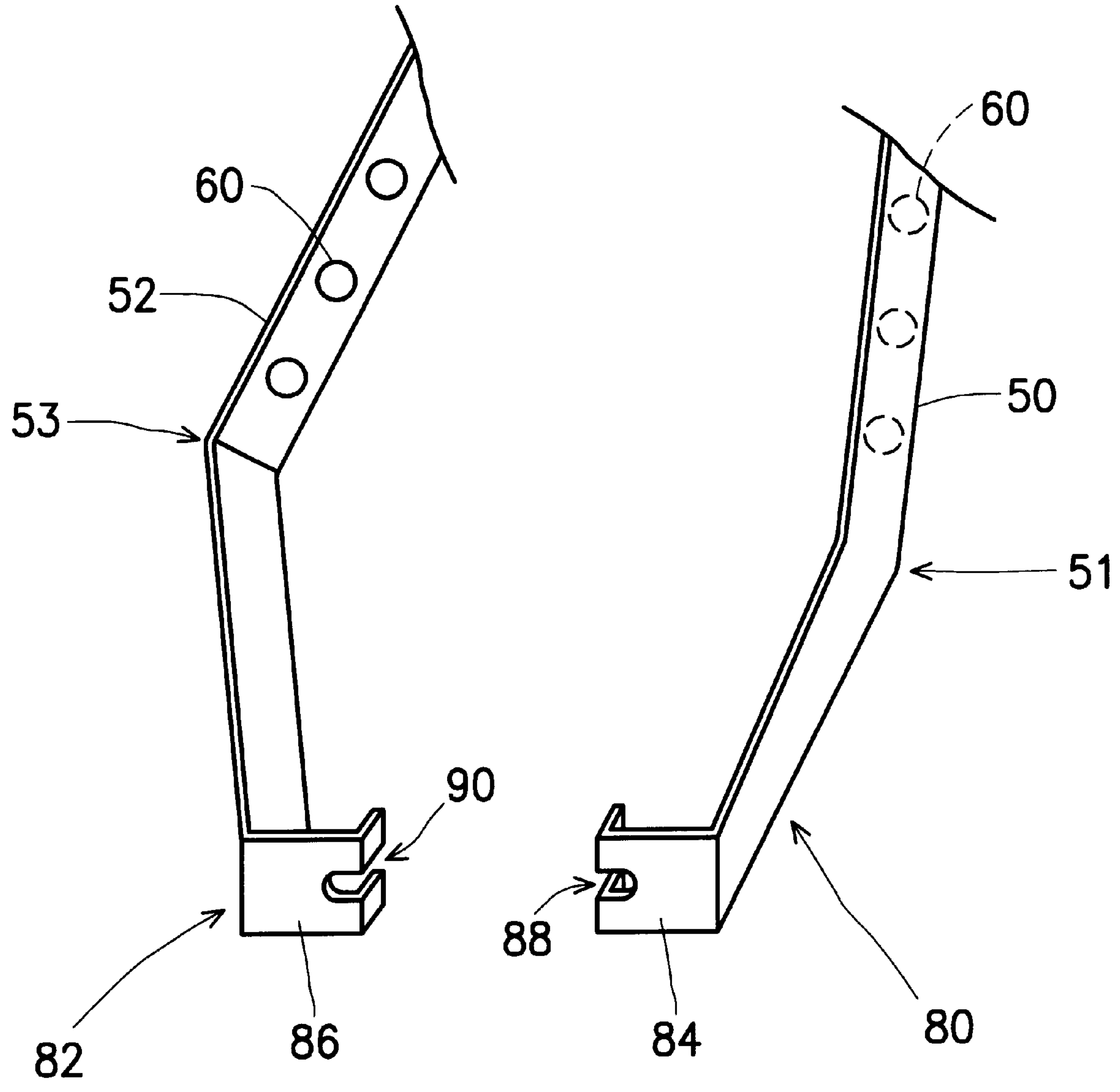
FIG. 3 is detailed structural diagram of the metal arms having positioning grooves and hooked sections according to this invention.
Figure 4:
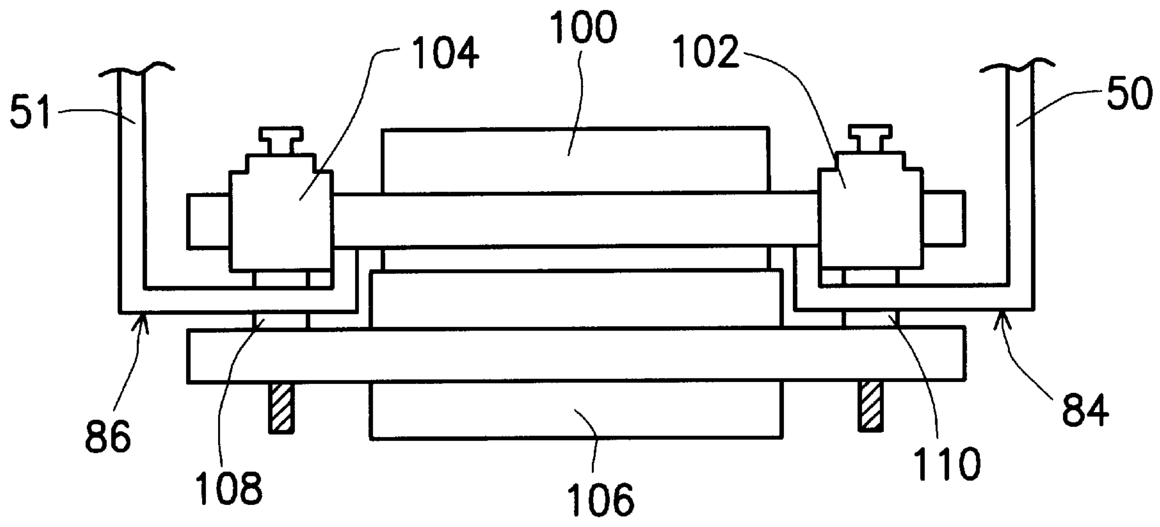
FIG. 4 is a diagram showing a D-type connector unplugging tool of this invention clamping to a D-type connector.

FIG. 3 is detailed structural diagram of the metal arms having positioning grooves and hooked sections according to this invention. As shown in FIG. 3, hooked sections 80 and 82 are symmetrically secured to the front end 56 of the metal arms 50 and 52, respectively. The hooked sections 80 and 82 are U-shaped extensions from the metallic arms 50 and 52 having notches 88 and 90 at the tips of the terminals 84 and 86, respectively. FIG. 4 is a diagram showing a D-type connector unplugging tool of this invention clamping to a D-type connector. As shown in FIG. 4, the U-shaped terminals 84 and 86 are designed such that when a D-type female connector 100 is clamped, the U-shaped terminals 84 and 86 can hook onto the respective padding plates 102 and 104 and avoid slipping away during the unplugging operation. The notches 88 and 90 are there to by pass the threaded holes 108 and 110 of the D-type male connector 106.

Figure 5:
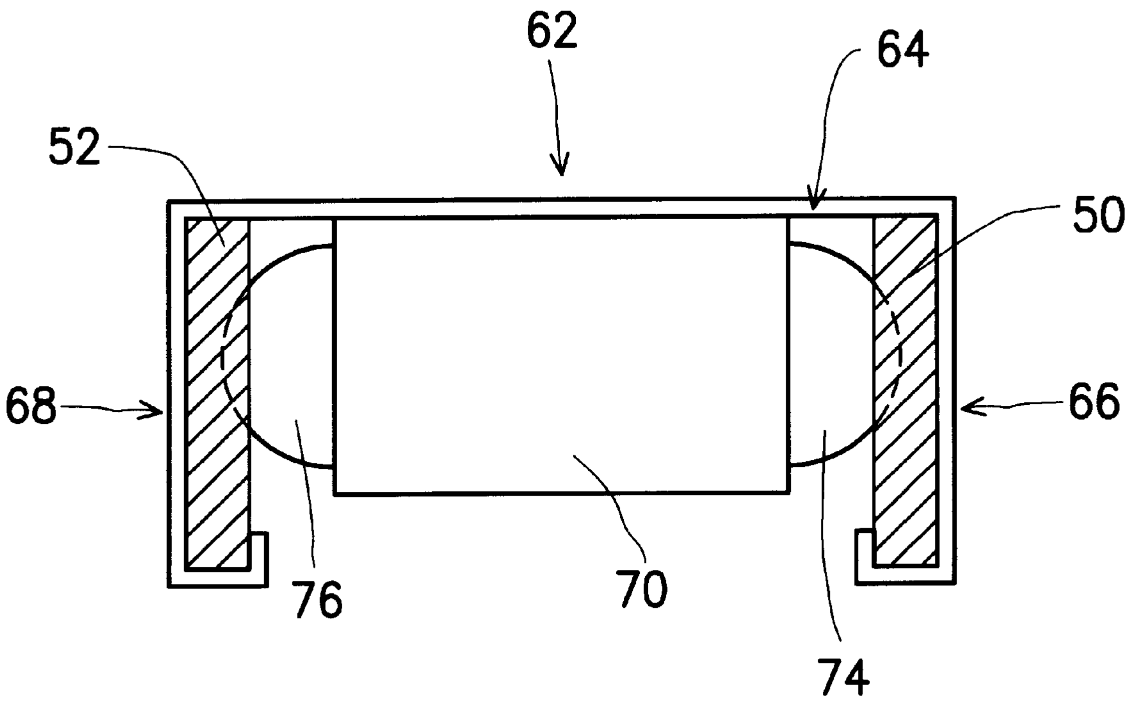
FIG. 5 is a top view of the push-pin assembly.
Figure 6:
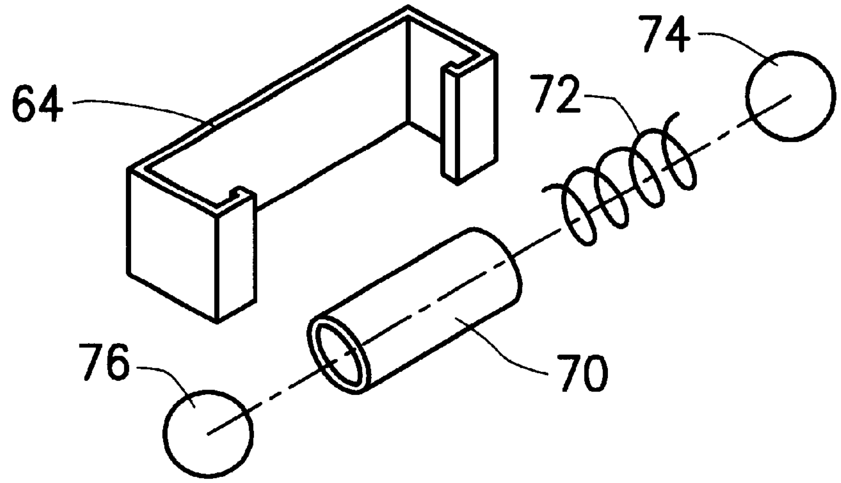
FIG. 6 is a diagram showing the components of a push-pin assembly.

Components and their detailed structural layout of the positioning device can be referred to in FIG. 3, FIG. 5 and FIG. 6, respectively. As shown in FIG. 3, there are a number of positioning grooves 60, for example, hemispherical grooves 60, along the metal arms 50 and 52. FIG. 5 is a top view of the push-pin assembly 62. The push-pin assembly 62 comprises a main body 64, for example, a metal bracket 64 with two ends 66 and 68 locally fastened onto the metal arms 50 and 52, respectively. The fastening may be achieved, for example, by a U-shaped bracket structure, such that the push-pin assembly is able to slide along the metal arms 50 and 52 between the front end 56 and the back end 54. FIG. 6 is a diagram showing the components of a push-pin assembly 62. As shown in FIG. 6, the push-pin assembly 62 further includes a circular tube 70 fixed onto the main body 64, for example, by welding. Inside the circular tube 70 is a compression spring 72 with steel balls 74 and 76 at each end. When the push-pin assembly 62 slides along the metal arms 50 and 52 between the front end 56 and the back end 54, the compressed spring 72 will push the steel balls 74 and 76 against the metal arms 50 and 52 till lodging the steel balls into one pair of hemispherical grooves 60, thereby locking the push-pin assembly 62 in position. As shown in FIG. 2, since the width of the push-pin assembly 62 is greater than the width of the metal-arm coupled back end 54, when the push-pin assembly 62 slide along the metal arms 50 and 52 between the front end 56 and the back end 54, the extent of the clamp opening will vary. For example, when the push-pin assembly 62 moves in the direction A, the clamp opening will close up a little. On the contrary, when the push-pin 62 is pushed in the opposite direction B, the clamp opening will open up some more. Therefore, the extent of clamp opening can be controlled.

In addition, to obtain a better and easier grip on the D-type connector during an unplugging operation, a bend can be made at suitable location on the metal arms 50 and 52 and forming bent sections 51 and 53 (as shown in FIG. 2 and FIG. 3) so that a section of the metal arms near the front end 56 can be roughly parallel. Furthermore, the positioning grooves can be so arranged to match the existing D-type connector sizes such that when the push-pin assembly 62 is on a particular pair of grooves, the correct clamp opening is immediately obtained, thereby providing a fast positioning means.

Although a two metal arm clamping structure is given in this preferred embodiment, the number of metal arms used is by no means restricted to two. In fact more arms may be employed to strengthen the gripping power. Similarly, the positioning may be accomplished through other component assembly, and not necessarily restricted to the positioning device using a spring, steel balls and positioning grooves in this embodiment.

Accordingly, the D-type connector unplugging tool of this invention has the following characteristics and advantages:

(1) the tool is simple to produce, and easy to operate;

(2) D-type connector heads can be firmly gripped and easily separated without causing any damages to the connector or its wiring;

(3) the clamp opening can be varied at ease and so a single unplugging tool can be used to unplug D-type connectors of different sizes; and (4) proper clamp opening can be obtained in a snap.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A D-type connector unplugging tool comprising:

a clamping structure having a front end and a back end, wherein the front end includes a clamp opening;

a positioning device mounted on the clamping structure capable of sliding along the clamping structure between the front end and the back end for varying the extent of the clamp opening and then freezing the clamp opening once a desired opening width is attained;

a handle fixed to the back end of the clamping structure;

two elongated metallic arms being coupled together at the clamping structure's back end;

hooked sections at the respective front ends of the arms, wherein the hooked sections are U-shaped extensions with an opening facing the back end of the clamping structure, each extension having a notch at the tip.

2. The unplugging tool of claim 1, wherein the positioning device further comprises:

a plurality of positioning grooves on the metallic arms between the front end and the back end;

a push-pin assembly which further includes:

a main body having two ends locally fastened onto the metallic arms such that the main body is capable of sliding along the two metallic arms between the front end and the back end;

a circular tube fixed to the main body;

a spring placed inside the circular tube;

two steel balls placed one at each end of the spring inside the circular tube such that as the push-pin assembly slides along the arms, the compressed spring pushes the steel balls against the arms till lodging into one pair of positioning grooves, thereby locking the push-pin assembly in position.

3. The unplugging tool of claim 1, wherein each metal arm has a bend somewhere along the metal arm to maintain a roughly parallel front metal arm section near the front end.

4. A D-type connector unplugging tool comprising:

two metal arms each having a front end and a back end, wherein the metal arms are coupled together at the back end, and forming a clamp opening at the front end;

a plurality of positioning grooves located at corresponding positions on the metal arms between the front and the back end;

a handle fixed to the back end of the metal arms;

two U-shaped extensions with an opening facing the back end of the clamping structure each U-shaped extension having a notch at the tip and secured to the front ends of the metallic arms; and a push-pin assembly including:

a main body having two ends locally fastened onto the metallic arms such that the main body is capable of sliding along the two metallic arms between the front end and the back end;

a circular tube fixed to the main body;

a spring placed inside the circular tube;

two steel balls placed one at each end of the spring inside the circular tube such that as the push-pin assembly slides along the metal arms, the compressed spring pushes the steel balls against the arms till lodging into one pair of positioning grooves, thereby locking the push-pin assembly in position.

5. The unplugging tool of claim 4, wherein each metal arm has a bend somewhere along the metal arm to maintain a roughly parallel front metal arm section near the front end.

* * * * *